No. 802,490. PATENTED OCT. 24, 1905.
W. B. M. BASHLIN.
VALVE.
APPLICATION FILED NOV. 3, 1902.
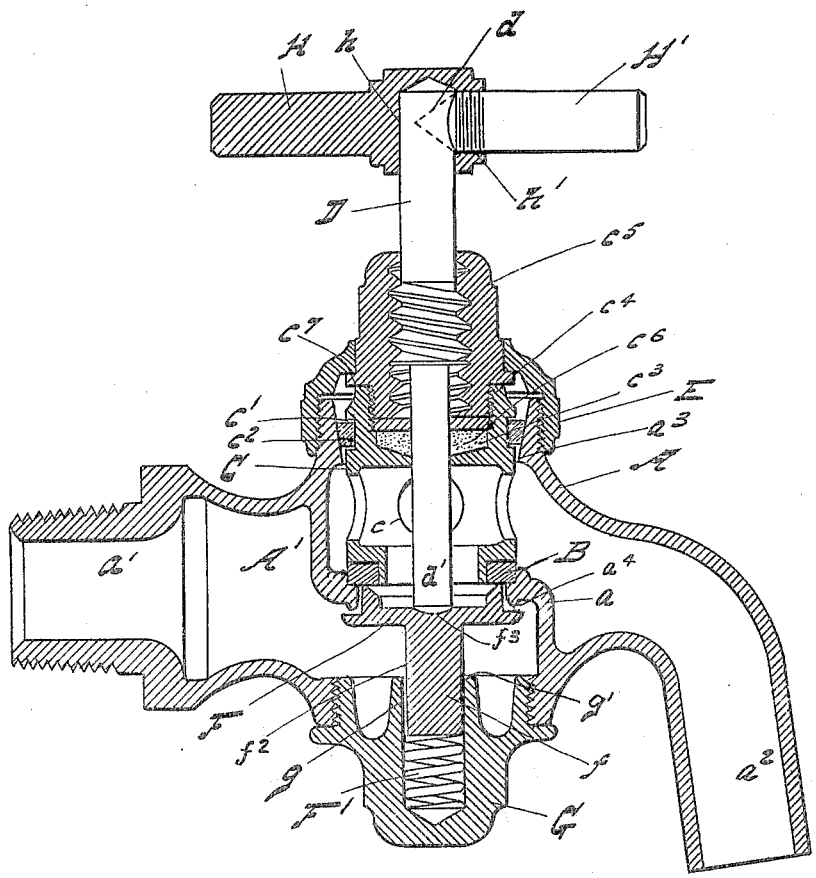

UNITED STATES PATENT OFFICE.

WILLIAM B. M. BASHLIN, OF WARREN, PENNSYLVANIA, ASSIGNOR TO THE BASHLIN COMPANY, OF WARREN, PENNSYLVANIA.

VALVE.

No. 802,490.        Specification of Letters Patent.        Patented Oct. 24, 1905.

Application filed November 3, 1902. Serial No. 129,875.

*To all whom it may concern:*

Be it known that I, WILLIAM B. M. BASHLIN, a citizen of the United States, residing at Warren, in the county of Warren and State of Pennsylvania, have invented new and useful Improvements in Valves, of which the following is a specification.

This invention relates to valves; and it consists in certain improvements in the construction thereof, as will be hereinafter fully described, and pointed out in the claims.

The purpose of the invention is to provide a valve in which the valve-seat and valve-disk may be readily removed for renewal and in which one of said parts may be removed with the valve under pressure.

The invention is illustrated in the accompanying drawings by a central longitudinal section through the valve.

A marks the valve-body. This has the passage $A'$ through it. The inlet end $a'$ of the passage $A'$ is separated from the outlet end $a^2$ by the usual diaphragm $a$. A removable seat B is arranged on the diaphragm $a$ and is preferably formed of composition. The follower C is passed through the opening $a^3$ and rests on the seat B. It has the openings $c$ to complete the passage through the valve. The opening $a^3$ is beveled. The follower is provided with a packing-groove $c'$, in which is placed a packing-ring $c^2$. As the follower is forced to place the beveled surface of the opening $a^3$, acting upon the ring $c^2$, makes a tight joint between the follower and the body. The upper end of the follower is provided with a stuffing-box $c^3$. The upper part of the stuffing-box is provided with a screw-seat $c^4$, into which is screwed the nut $c^5$. The nut $c^5$ contacts the washer $c^6$ and compresses the packing material in the stuffing-box $c^3$. Arranged on the outside of the nut $c^5$ is a shoulder $c^7$. The flange-nut E engages this shoulder and forces this nut, with follower, to its place.

The stem D is provided with the usual screw-thread, which operates in the nut $c^5$. The lower end $d'$ of the stem is rounded and operates in a cup $f^3$ of the disk F, the stem thereby forming a guide for the disk. This valve-disk operates on the seat B and makes a complete closure. It is provided with the guide-stem $f$. This works in a socket $g$ of the removal cap G. Arranged in the lower end of the socket $g$ is a spring $F'$. This spring forces the valve to its seat. The pressure of the spring is of course supplemented by the pressure of the fluid in the passage. The upper edge $g'$ of the socket forms a stop for disk. The stem $f$ is slightly flattened at $f^2$ to permit the circulation in the socket $g$. The opening $a^3$ should be sufficiently large to permit the removal of the follower and seat, and the opening formed by the removal of the cap G should be sufficiently large to permit the removal of the valve-disk. By this construction of the valve it will readily be seen the seat may be readily removed, the valve-disk making sufficient closure on the auxiliary seat $a^4$ to hold the fluid in the passage $a'$ during the removal and renewal of the seat. By this construction also the pressure which may be exerted on the valve-disk is uniform, thus relieving the valve-seat of the strain usual to valves that are closed by direct pressure from the stem. The upper end of the stem is provided with screw-seat $d$. A handle part H is provided with an opening $h$, into which the end of the stem is placed. Opposite the screw-seat $d$ is a screw-threaded opening $h'$, and screwed into this opening is a handle part H'. The screw-seat $d$ is preferably conically shaped and the end of the handle part $h'$ shaped to fit this. It will be noted that these parts when assembled have the appearance of one solid piece, are quickly assembled, and the handle is securely locked against rotation on the stem.

What I claim as new is—

1. In a valve the combination with a valve-body having a passage therethrough and a diaphragm therein separating the outlet and inlet ends of said passage, said passage having a beveled opening $a^3$ opposite said diaphragm; a removable valve-seat arranged on said diaphragm; a follower arranged on said valve-seat, said follower having a packing-groove therein opposite the beveled surface of the opening $a^3$, a packing arranged in said groove; a valve-disk arranged to operate upon the seat; a stem passing through said follower and arranged to operate said disk.

2. In a valve the combination with a valve-body having a passage therethrough with a diaphragm separating the outlet and inlet ends of said passage; a removable seat arranged on said diaphragm; a follower arranged on said seat, said follower having a stuffing-box therein; a nut arranged to exert pressure on said stuffing-box; packing in said stuffing-box; a stem arranged to operate in said nut, said stem extending through said stuffing-box; and follower; and a valve-disk arranged to operate upon said seat and to be operated by said stem.

3. In a valve the combination with a valve-body having a passage therethrough having a diaphragm separating the outlet and inlet ends of said passage, said body having the beveled opening $a^3$ opposite said diaphragm; the seat B arranged on the diaphragm; the follower C arranged on said seat; said follower being provided with a packing-groove $c'$ and stuffing-box $c^3$; the packing-ring $c^2$ arranged in the groove $c'$ and against the beveled shoulder $a^3$; the nut screwed into the end of the follower, and arranged to exert pressure on a packing in the stuffing-box; a packing material in the stuffing-box; the flange-nut E arranged to engage the nut $c^5$, said flange-nut being secured to the body; the stem D operating in the nut $c^5$ and extending through the stuffing-box $c^3$ and follower C; and a valve-disk operating upon said seat and arranged to be operated by said stem.

4. In a valve, the combination with a valve-body having a passage therethrough, with a diaphragm separating the outlet and inlet ends of said passage, said diaphragm having a valve-seat thereon; a removable valve-seat on said diaphragm; a valve-disk having two seating-surfaces, one of said surfaces being arranged to operate normally upon said removable seat and the other surface to form a closure of the seat on the diaphragm after the removal of the removable seat; said lateral surface on the valve and seat on the diaphragm being at an angle to the axis of the valve; a spring arranged to force the disk to its seat and positive means operating through said removable seat for opening the valve.

5. In a valve or the like the combination of a stem having a screw-seat therein; a handle part having an opening for the stem, and a screw-threaded opening opposite the screw-seat; and a second handle part having a screw-threaded end adapted to be screwed into the screw-threaded opening against said seat.

6. In a valve or the like the combination of the stem having a conical-shaped seat therein; a handle part having an opening for the stem and a screw-threaded opening opposite the screw-seat; and a second handle part having a screw-threaded end adapted to be screwed into the screw-threaded opening against said seat, the part coming in contact with the seat being shaped to conform to the seat.

In testimony whereof I have hereunto set my hand in the presence of two subscribing witnesses.

WILLIAM B. M. BASHLIN.

Witnesses:
   D. U. ARIED,
   O. DURLIN.